Jan. 31, 1961 C. S. JACKOWSKI ET AL 2,969,729

MULTISPEED INDEXING DEVICE

Filed June 17, 1959 8 Sheets-Sheet 1

INVENTORS
CHARLES S. JACKOWSKI
& FRED SALTZ,
BY Geoffrey Knight
ATTORNEY

Jan. 31, 1961

C. S. JACKOWSKI ET AL 2,969,729

MULTISPEED INDEXING DEVICE

Filed June 17, 1959

8 Sheets-Sheet 4

Jan. 31, 1961 C. S. JACKOWSKI ET AL 2,969,729

MULTISPEED INDEXING DEVICE

Filed June 17, 1959 8 Sheets-Sheet 5

| FOR LINE | TENS COL. | UNITS COL. |
|---|---|---|
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 0 | 7 |
| 8 | 0 | 8 |
| 9 | 0 | 9 |
| 10 | 1 | 0 |
| 11 | 1 | 1 |
| 12 | 1 | 2 |
| 13 | 1 | 3 |
| 14 | 1 | 4 |
| 15 | 1 | 5 |
| 16 | 1 | 6 |
| 17 | 1 | 7 |
| 18 | 1 | 8 |
| 19 | 1 | 9 |
| 20 | 2 | 0 |
| 21 | 2 | 1 |
| 22 | 2 | 2 |
| 23 | 2 | 3 |
| 24 | 2 | 4 |
| 25 | 2 | 5 |

Jan. 31, 1961 C. S. JACKOWSKI ET AL 2,969,729

MULTISPEED INDEXING DEVICE

Filed June 17, 1959 8 Sheets-Sheet 6

Jan. 31, 1961 C. S. JACKOWSKI ET AL 2,969,729

MULTISPEED INDEXING DEVICE

Filed June 17, 1959 8 Sheets-Sheet 7

2,969,729

MULTISPEED INDEXING DEVICE

Charles S. Jackowski, Endicott, and Fred Saltz, Binghamton, N.Y., assignors to International Business Machines Corporation, New York, N.Y., a corporation of New York Filed June 17, 1959, Ser. No. 821,000

14 Claims. (Cl. 101—93)

This invention relates to indexing devices and more particularly to a cyclically operable multispeed indexing device.

The need for a multispeed indexing device arises when objects are to be positioned at one of a plurality of positions which are progressively more distant from the initial point of the object. The high speed mode of operation is used to shorten the portion of the machine cycle needed to position the object in the more distant positions.

Multispeed indexing devices may generally be divided into two broad categories; positive feed devices and cam actuated devices. One important difference which exists between these two categories concerns the means whereby speed changes are effected.

Positive feed devices generally involve schemes wherein the feeding device, after being set for a particular indexing position, changes speed when either the object being moved or a control mechanism moving in synchronism with said object reaches a predetermined position thus actuating a switch.

Practical considerations in certain applications make it desirable that the speed changes, starts and stops be effected by controls which are independent from the actual movement of the object.

Cam actuated devices after being set for a desired index position effect the transition between speeds at points in the machine cycle which are established by the shape of the cam, hence, the changes in speed are independent of the actual movement of the object being positioned. However, cam driven devices are expensive to design and manufacture and furthermore the need for accurate positioning usually necessitates an auxiliary device for the final positioning.

The object of the invention is to provide an improved multispeed indexing device.

A further object of this invention is to provide a multispeed indexing device with positive gear feed and positive stops, which is capable, after being set for a desired index position, of effecting all transitions between speeds, stops and starts at specific points in the machine cycle which are predetermined by the machine's design and independent from the actual movement of the object being positioned.

A further object is to provide a multispeed indexing system which does not need to be reset.

A further object is to provide a multispeed indexing system consistent with the above objects and using a minimum of control circuitry.

Other objects of the invention will be pointed out in the following description and claims and illustrated in the accompanying drawings, which disclose, by way of example, the principle of the invention and the best mode which has been contemplated of applying that principle.

Figure 2:
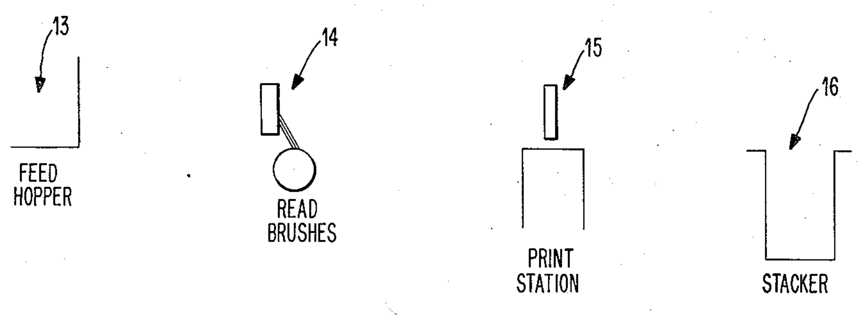
Fig. 2 is a schematic diagram of an interpreter.
Figure 3:
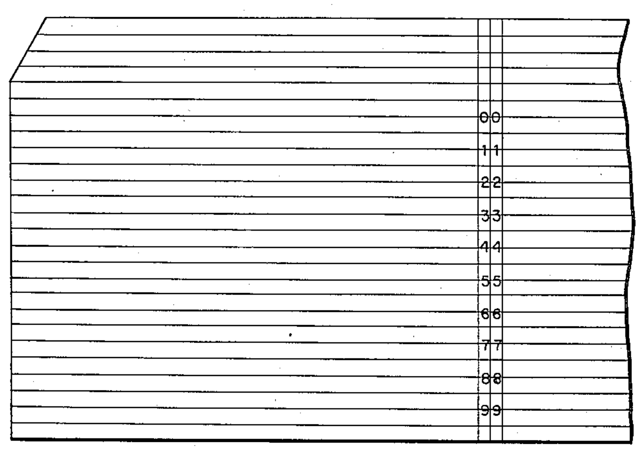
Fig. 3 is a portion of a tabulating card.

In the particular embodiment of the invention shown herein the multispeed indexing device is applied to a document transport system and more particularly to an IBM card printing device hereinafter called an interpreter (shown schematically in Fig. 2) wherein the objects to be indexed are IBM cards (Fig. 3). This embodiment as shown is merely one application of this multispeed indexing system and it is understood that the invention could be used to position various objects in a multitude of other embodiments. Furthermore, the invention is not limited to a two speed device, since by appropriate arrangement a plurality of speeds could be accommodated.

The embodiment as shown is an improvemnet upon the interpreter shown in U.S. Patent 2,753,793.

The interpreter (Fig. 2) takes punched IBM cards (Fig. 3) from hopper 13, reads (at station 14) the information which is punched in the card, prints (at station 15) certain characters on one of the card's 25 lines as directed by the information read, and then moves the cards to a stacker 16. The information punched in two columns of the card, for example the two columns shown in Fig. 3 hereinafter referred to as the units column and the tens column, designate which line of the card is to be printed.

Figure 1:
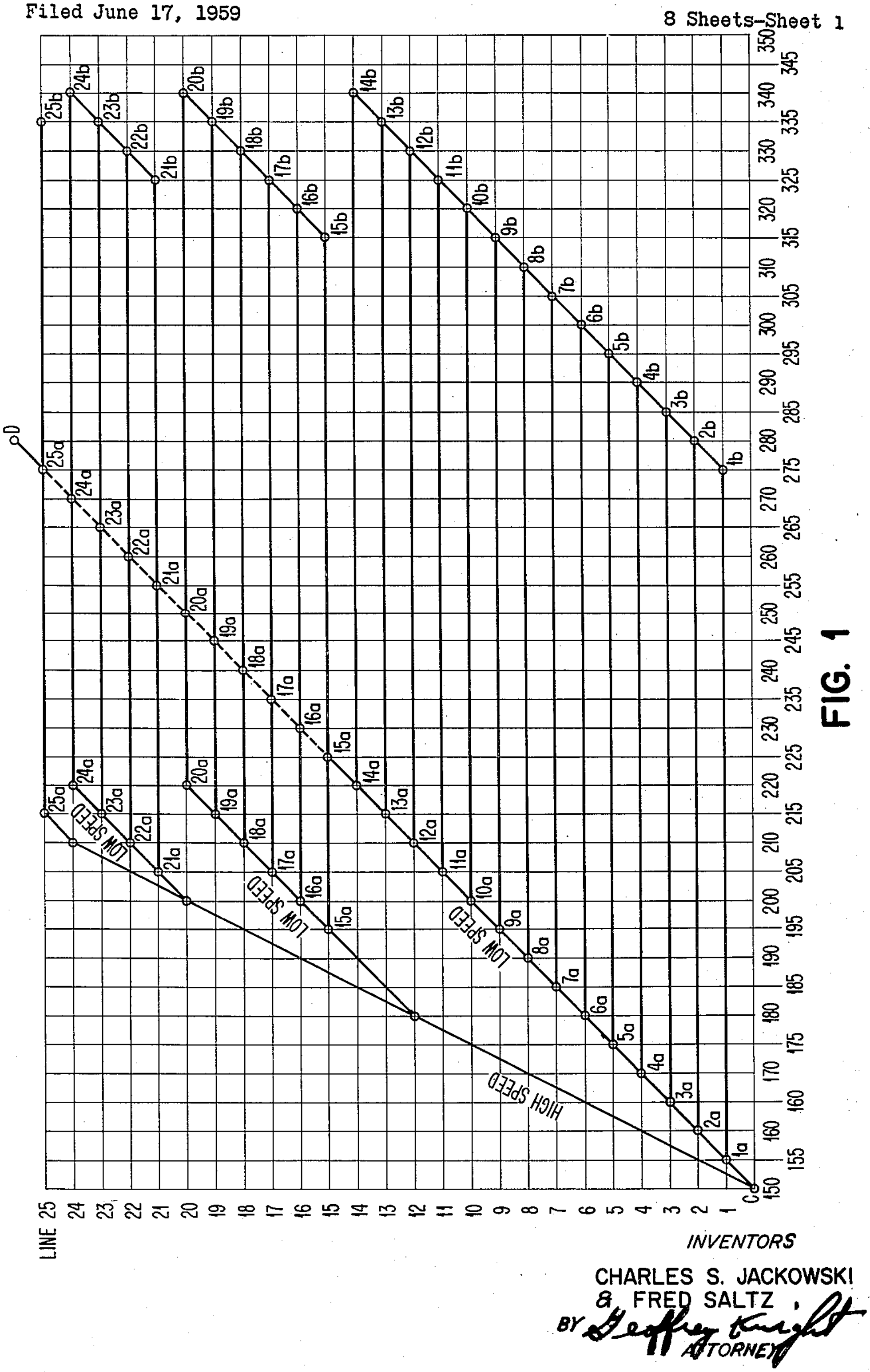
Fig. 1 is a timing diagram.

The principle of this invention may be most readily understood with reference to Fig. 1 in which the vertical scale represents the distance of card movement showing print positions 1 to 25, the horizontal scale represents time measured in units of degrees of the 360 degree machine cycle, and the slope of the lines represents speed of card movement.

Continued movement of the card at the basic machine speed which is established by the design consideration of other parts of the machine would place the cards in print positions 1 to 25 at times indicated by the points along line CD, thereby utilizing a 125 degree portion of the machine cycle between 150 degrees and 275 degrees for positioning. By selectively increasing the speed of card movement during specific portions of the cycle determined by the desired print position the invention herein shown reduces the time required to position the cards in the more distant positions, thereby reducing the portion of the cycle needed for positioning to the 70 degree portion of the cycle between 150 degrees and 220 degrees.

As shown by Fig. 1, positions 1 to 14 are reached by merely using the slow speed mode of operation; however, positions beyond 14 are reached by a combination of slow and high speed movement. In addition, stopping is always accomplished from the slow speed mode of operation in order to reduce inertial stresses.

Hereinafter the term "characteristic index number" will be used to refer to a specfic number which is divisible into 360 and which pertains to and is characteristic of a particular embodiment of the invention. Any particular embodiment of the invention will have a particular "characteristic index number" and for the particular embodiment shown herein the "characteristic index number" is 5.

The desire for cyclic operation without resetting imposes the fundamental requirement that all stops, starts, or transitions between speeds must take place at points in the 360 degree cycle of the machine which are integral multiples of this "characteristic index number." These points called characteristic index points can be measured either in reference to the position of the driving means or in reference to the position of the driven means. Due to the play which may exist in the gear train, there may be a difference between these measurements.

Figure 4:
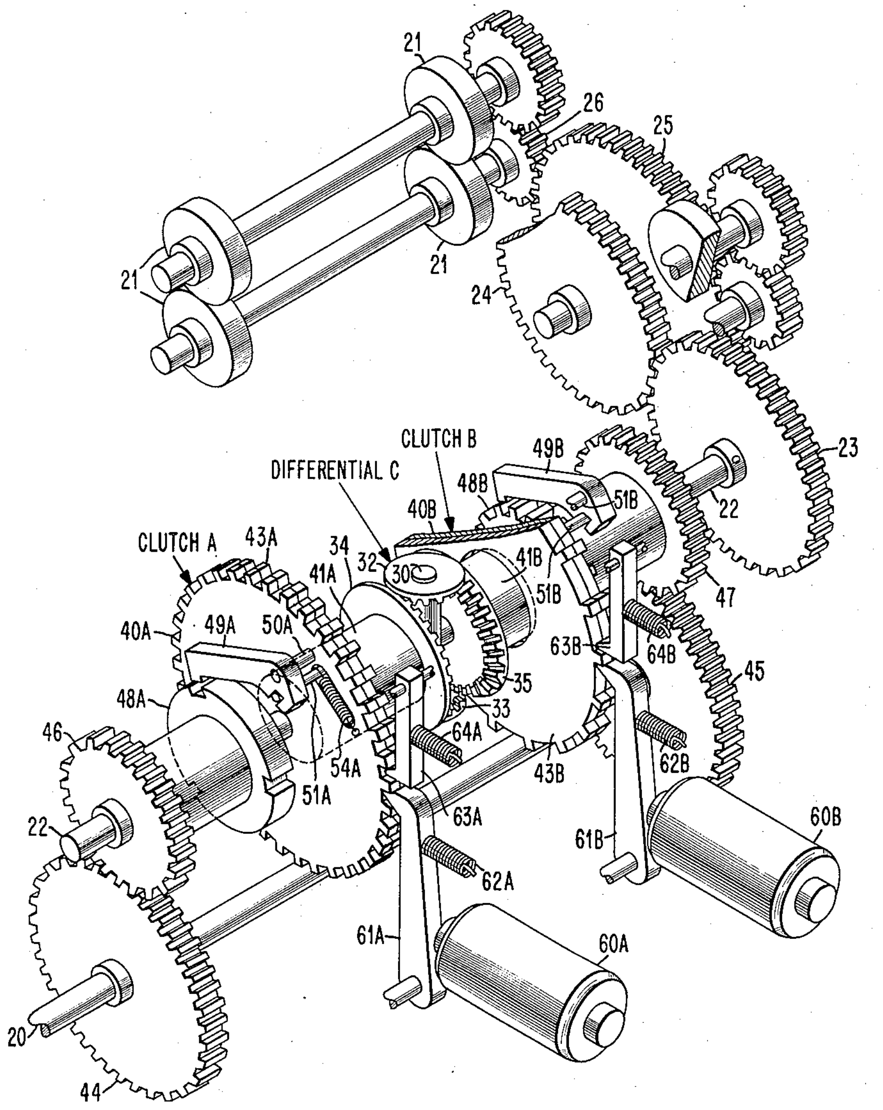
Fig. 4 is a perspective of the clutch assembly mechanism for a multispeed indexing system embodying my invention.

With reference to Fig. 4, the mechanical components of the device will now be explained postponing until later a description of the control circuitry which actuates the clutches in accordance with the information read from the card.

Power to drive the mechanism is supplied by the continuously rotating shaft 20 and the cards are moved by a series of drive rolls exemplified by rolls 21, hence, the invention will be shown as applied to a device for controlling the rotation of rolls 21 in relation to the rotation of shaft 20. One revolution of shaft 20 will be considered as one machine cycle and equivalent to 360 degrees of machine time.

The output of the clutching mechanism is provided by shaft 22 which is directly connected to drive rolls 21 through the gear train 23, 24, 25 and 26. Shaft 22 can be driven at slow speed by engaging clutch A or at high speed by engaging both clutch A and clutch B in a manner to be described.

The outputs from the clutches are summed in differential C which comprises shaft 30 perpendicularly attached to shaft 22, pinions 32 and 33 mounted for free rotation on shaft 30, and gears 34 and 35 driving pinions 32 and 33, said gears 34 and 35 being respectively attached to discs 40A and 40B by means of sleeves 41A and 41B which extends through discs 43A and 43B.

The drive for both clutch mechanisms is taken from shaft 20 through their respective gears 44 and 45 which are fixed to said shaft 20. Gears 44 and 45 mesh with gears 46 and 47, respectively, which are freely rotatable on shaft 22 and respectively secured to notch discs 48A and 48B.

In clutch A gear 34 is rotatably mounted on shaft 22 and attached to disc 40A by means of sleeve 41A with disc 43A rotatably mounted on said sleeve 41A. Pawl 49A (see Figs. 5 and 6) is mounted on disc 40A by means of pin 50A such that it may engage the notches on notch disc 48A, said notch disc 48A being rotatably mounted on shaft 22 and attached to gear 46. Cam pin 51A mounted on disc 43A extends through slot 52A in disc 40A and engages pawl 49A in slot 53A such that relative motion between discs 40A and 43A lifts pawl 49A against the action of spring 54A. The relative motion between discs 40A and 43A is limited by the length of slot 52A.

The construction of clutch B (Fig. 7) is identical to clutch A with the exceptions that notch disc 48B has 18 notches whereas notch disc 48A has three notches and the discs 40B and 43B of clutch B have 18 teeth whereas the discs 40A and 43A of clutch A have 36 teeth.

An essential feature of this invention is the relationship of the spacing between teeth on the clutch discs 40A, 43A, 40B and 43B and the spacing between notches on notch discs 48A and 48B. The spacing between the teeth on discs 40A, 43A, 40B and 43B must be an integral multiple of the spacing between notches on the respective notch gears 48A and 48B (the spacing to be measured between center lines of teeth or notches). The spacing must be so apportioned that when the controls are actuated, a tooth or notch as needed presents itself for engagement.

Figure 5:
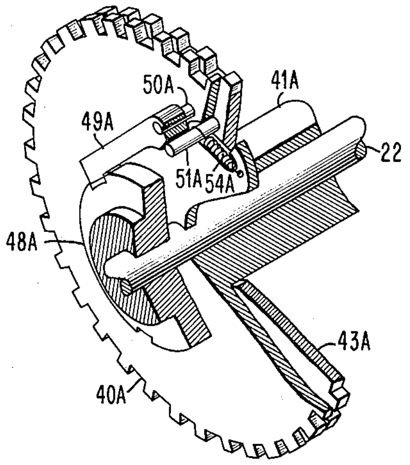
Fig. 5 is a perspective view of clutch A.
Figure 6:
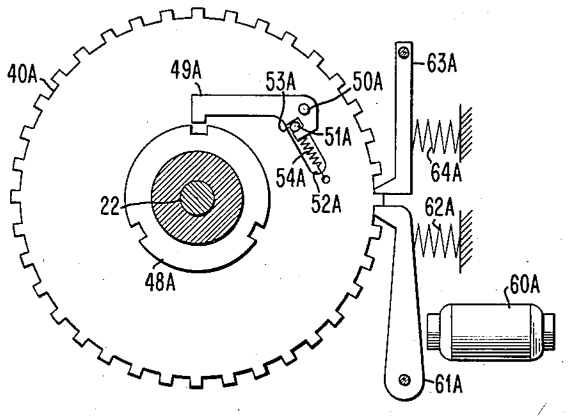
Fig. 6 is a side elevation of clutch A.

Disregarding the control circuitry and the control cams which will be explained in detail later, operation of the mechanism will be explained with reference to clutch A which is driven by the continuously rotating shaft 20 through gears 44, 46 and notch gear 48A. While clutch A is driving the teeth on discs 40A and 43A are out of alignment as shown in Fig. 5.

Disengagement of clutch A is effected through electromagnet 60A, deactivation of which will cause lever 61A to engage disc 43A under the action of compression spring 62A thereby stopping the rotation of disc 43A. As disc 40A continues to rotate under the action of pawl 49A which is engaged in notch disc 48A, the relative motion between discs 40A and 43A will cause cam pin 51A to lift pawl 49A out of engagement with notch disc 48A, thereby completing disengagement of clutch A five degrees after the deactivation of electromagnet 60A (see Fig. 9). Likewise, clutch engagement is effected five degrees after the electromagnet is activated. Lever 63A under the action of compression spring 64A prevents discs 40A and 43A from rotating in the reverse direction.

Clutch B works in a manner identical to that just described for clutch A.

Figure 9:
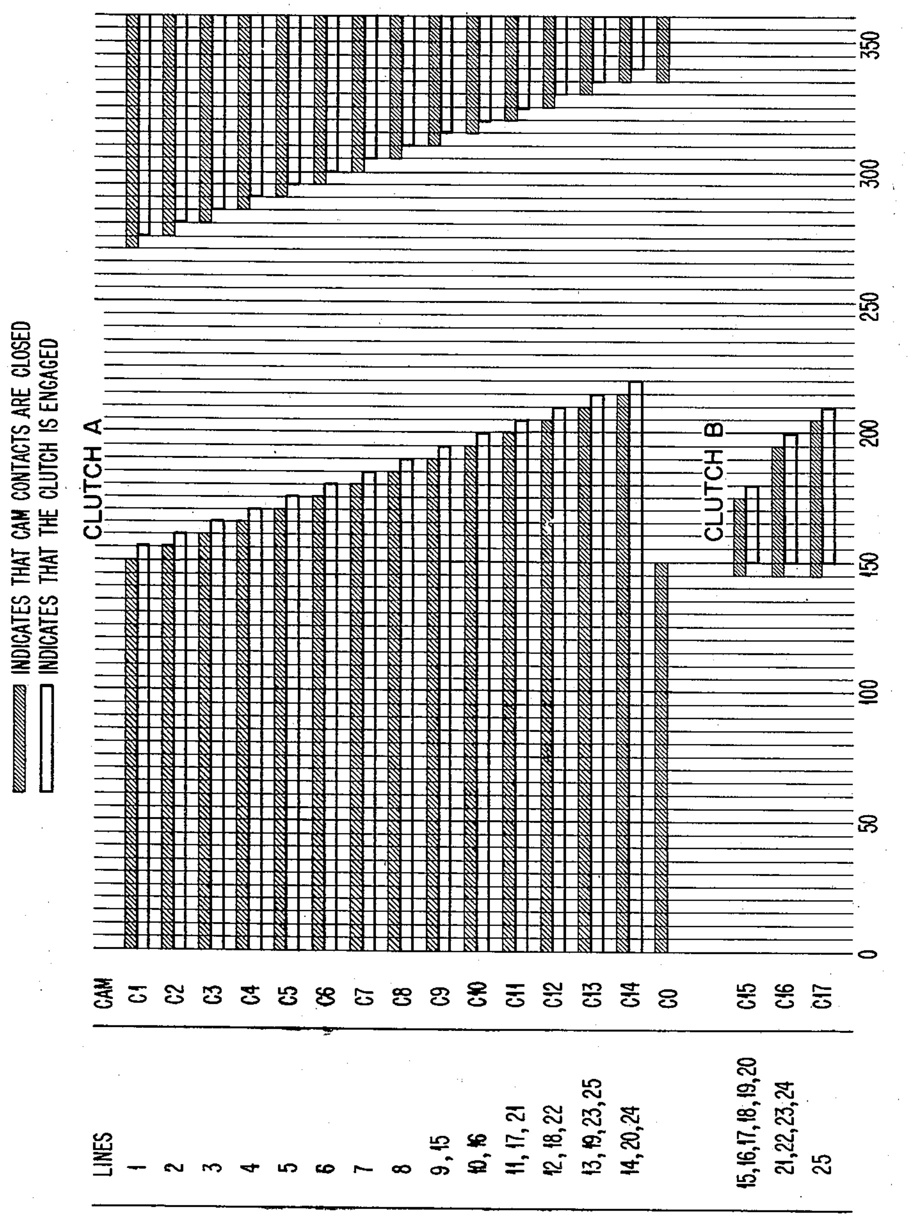
Fig. 9 is a cam and clutch timing chart.

The bars which are not crosshatched in Fig. 9 show the position in the cycle at which the clutches engage and disengage for positioning at the various lines on the card. Engagement and disengagement of the clutches being under the control of electromagnets 60A and 60B operate as before described.

If neither of the electromagnets is activated, torque will not be transmitted through either the clutch A or clutch B and hence drive rolls 21 will be stationary. If electromagnet 60A is activated and electromagnet 60B is not activated, torque will be transmitted through the clutch A. Hence, the output shaft 22 will turn at one-half the speed of gear 46 (called slow speed), the speed reduction being accomplished in the differential C. Likewise, if electromagnet 60B is activated and electromagnet 60A is not activated, torque will be transmitted through clutch B and the output shaft 22 will rotate at one-half the speed of input gear 47 (in the embodiment shown herein, this condition never occurs). If both the electromagnets 60A and 60B are activated, torque will be transmitted through both clutch A and clutch B. Hence, both gears 34 and 35 will be inputs to the differential C and the output shaft 22 will rotate at a speed equal to that of the input gears 46 and 47 (called high speed).

The control mechanism will be explained with reference to Figs. 8, 9, 10 and 11.

Relay coils are designated by a capital letter followed by a number. The letters U or T indicate that the relay is associated with information from the "units" column on the card or the "tens" column, respectively. The numbers 0 to 9 indicate which row of the card was the source of the information stored in the relay.

Relay contacts are designated by a capital letter, a number, and a smaller case letter. The capital letter and number designate which relay coil controls the contacts and the smaller case letter designates the particular set of contacts. All relay contacts are normally open (with the exception of the one set of contacts designated X*a* which is normally closed).

At the zero cycle point cam contact C0 (Fig. 11) closes, actuating electromagnet 60A and engaging clutch A, thereby driving the card at the slow speed during the card reading operation which is completed by the 150 degree cycle point at which time cam contact C0 opens. (Cam timing is shown by the crosshatched bars in Fig. 9.)

The switching necessary during the card reading operation is provided by commutators U and T (Fig. 10) which make one revolution per machine cycle, the brushes of the commutators being synchronized with the card feed so as to make contact with successive commutator segments as successive corresponding rows of the card are being read.

If a hole is punched in any position of the card, contact will be made by the read brushes 14 when the commutator passes the corresponding segment and the relay associated with that position will be actuated. Each of said relays has a set of contacts which holds the relay actuated after the commutator has passed that position. (For example, the contact U0*a* holds the relay U0 energized once it has been actuated.)

The hold contacts are rendered ineffective when the relays are reset by the action of cam C18 which breaks contact at the 350 degree point in the cycle and makes contact at the zero point in the cycle.

Figure 11:
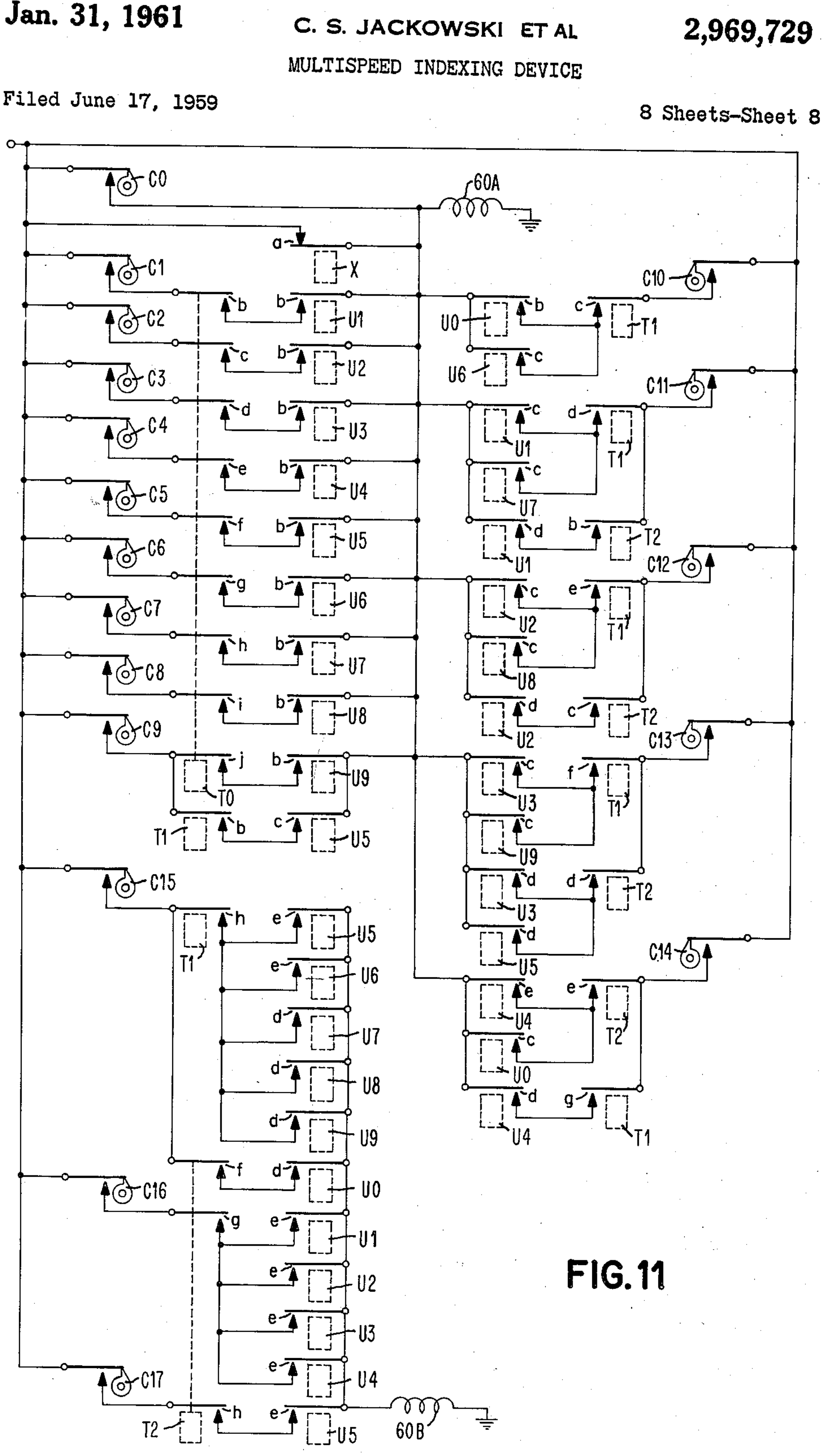
Fig. 11 is a circuit diagram of the control relays and control cams.

Relays U0 through U9 and relays T0 through T2 have some of their relay contacts in the clutch controls shown in Fig. 11. The controls for electromagnet 60A and 60B consist of the cam contacts and relay contacts shown in Fig. 11. The cross-hatched bars of Fig. 9 show the points in the cycle where the various cams make and break contact. Each of the cams makes one complete revolution per cycle of machine operation.

In order for current to flow through electromagnets 60A or 60B, one of the cam contacts associated with the coils must be closed and in addition the relay contacts associated with said cam must also be closed. That is, in order for electromagnet 60A to be actuated one of the cams C0 through C14 must be closed at the same time that the relay contacts in series with that cam are closed. Likewise, in order for electromagnet 60B to be actuated, either cam 15, 16 or 17 must be closed and there must be a complete circuit through one of the paths of series relay contacts associated with said cam.

Figure 10:
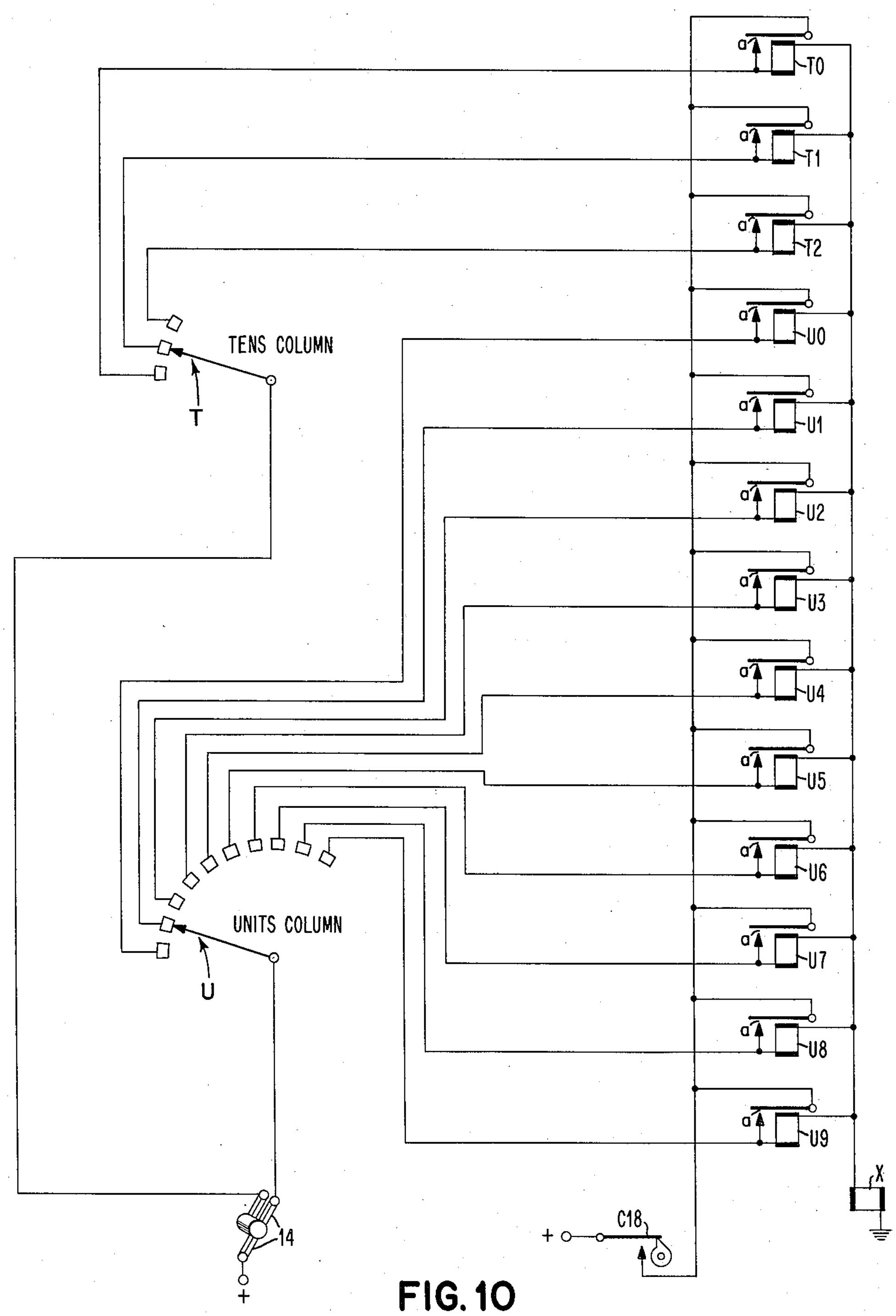
Fig. 10 is a circuit diagram of the line selection relays.

Contacts X*a* which are normally closed provide for the engagement of clutch A in order to carry the card through the print station without indexing in the event that there were no holes punched in the units or tens columns of the card. Relay coil X will be actuated thereby opening contacts X*a* as soon as the first card is read and any one of the other relay coils shown on Fig. 10 is actuated.

Figures 7, 8:
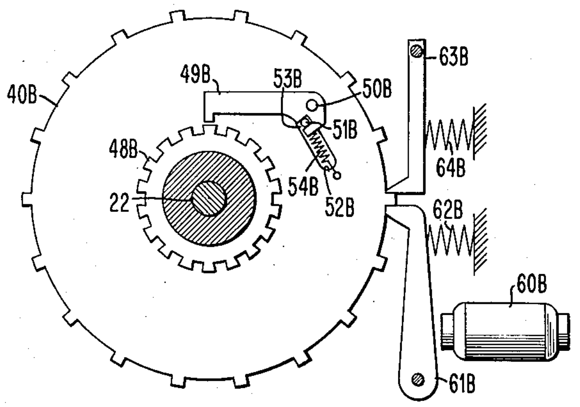
Fig. 7 is a side elevation of clutch B.
Fig. 8 is a table for interpreting the line designation code.

As an example of machine operation, assume that a card is fed into the machine which has a hole punched in the one row of the tens column and in the eight row of the units column. Reference to Fig. 8 shows that such a card is to be positioned for printing on line 18.

Cam C0 will close at the zero cycle point thereby engaging clutch A and driving the card at slow speed during the read operation. As the commutator U passes the "eight" segment contact will be made through the hole punched in the "eight" row of the card and relay U8 will be activated. Actuation of relay U8 will close contacts U8*a*, thereby holding the relay U8 in the actuated condition until cam contacts C18 open (at the 350 cycle point).

Likewise, when commutator T passes the "one" segment, contact will be made through the hole punched in the "one" row of the card, thereby actuating relay T1 and closing contacts T1*a*. Hence, at the 150 degree point in the cycle (after which time C0 is open) relays T1 and U8 are actuated, and all contacts associated with these relays are closed. All other relays are unactuated (with the exception of X) and the relay contacts associated with these other relays are open.

With reference to Fig. 11, we note that relay U8 has three sets of contacts in the control circuit, and relay T1 has seven sets of contacts in the control circuitry. In the present example, all these contacts will be closed at the 150 degree point in the cycle by which time the reading operation will have been completed. Furthermore, relay coil X (Fig. 10) will be actuated by the current flowing through coils U8 and T1 thereby opening contacts X*a* which are normally closed. Relay contacts U8*b* which are closed in series with T0*i* which is open, thereby rendering contact U8*b* ineffective at this time. Relay contact U8*c* is in series with relay contact T1*e*, both of which are closed; therefore, if cam C12 is closed, we will have a complete circuit actuating clutch A through electromagnet 60A. With reference to Fig. 9 we note that the cam C12 makes contact at 325 degrees and remains closed until 205 degrees; therefore, clutch A remains engaged until the 210 degree cycle point. Cam C12 will again make contact at the 325 degree point in the cycle re-engaging clutch A to carry the card out of the machine.

Hence, in the particular example considered here, clutch A is driving at all times except between 210 degree cycle point and 330 degree cycle point.

We also note that relay contact U8*d* is in series with relay contact T1*h*, both of which are closed. Hence, clutch B magnet 60B will be actuated and clutch B will be driving if cam C15 is closed. Again with reference to Fig. 9 we note that cam C15 closes at the 145 degree point in the cycle and remains closed until the 175 degree point in the cycle.

Considering the five degree lag between the time when an electromagnet is engaged and the time when the clutch starts driving, we note that clutch B will start driving at the 150 degree point in the cycle and stop driving at the 180 degree point in the cycle.

Combining the operation of both clutches we see that only clutch A will drive up to the 150 degree point giving us our slow speed mode of operation until this time. Between 150 degrees and 180 degrees both clutch A and clutch B are driving, giving us the high speed mode of operation. Between 180 degrees and 210 degrees clutch A is the only clutch driving thereby giving us a slow speed mode of operation. Between 210 degrees and 330 degrees neither of the clutches is driving thereby allowing the card to remain stationary. At the 330 degree point the slow speed clutch again starts driving, giving us our slow speed mode of operation to carry the card into the stacker. Similarly for the other line positions, operation proceeds in the patterns shown in Fig. 1.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an indexing device, driving means, driven means, speed change gearing interconnecting said means, said speed change gearing comprising a plurality of clutching means adapted to establish driving connections between said driving means and said driven means having different speed ratios, each of said clutching means comprising a rotatable control element, each of said control elements having a plurality of stop members thereon spaced at equal angular distances; a plurality of detent means, one for each of said control elements, adapted to engage selected stop members of their respective control element, and means associated with each of said control elements for engaging the related clutching means when the appertaining control element is released by the corresponding detent means and for disengaging the related clutching means when the appertaining control element is stopped by the corresponding detent means, said control elements being geared to said driven means so as to determine an exact position of said driven means when stopped by said detent means, the stop members on said control elements being so spaced that in every possible combination of stop positions of said control elements said driven member will be stopped in one of a series of evenly spaced index positions.

2. In a cyclic device for positioning record cards at a print station at the specific line on the card designated by line selection indicia thereon; driving means, driven means, speed change gearing interconnecting said means, said speed change gearing adapted to establish driving connections having different speed ratios between said driving means and said driven means, and including a plurality of dog type clutching means; control means adapted to engage and disengage said clutching means at one of a plurality of specific disengagement points in the cycle; means for sensing said indicia, and means responsive to said sensing means and adapted to activate said control means to selectively engage and disengage said clutching means at said disengagement points such that the record card will arrive at the desired printing position at a predetermined point in the cycle.

3. In a cyclic device for positioning record cards at a print station at the specific line on the card designated by line selection indicia thereon; driving means, driven means, speed change gearing interconnecting said means, said speed change gearing adapted to establish driving connections having different speed ratios between said driving means and said driven means, and including a plurality of dog type clutching means, the spacing between the possible engagement positions of each of said dog type clutching means being equal and bearing a multiple relationship to the spacing between the possible engagement positions of the other dog type clutching means, control means adapted to engage and disengage said clutching means at one of a plurality of specific disengagement points in the cycle; means for sensing said indicia; and means responsive to said sensing means and adapted to activate said control means to selectively engage and disengage said clutching means at said disengagement points such that the record card will arrive exactly at the desired printing position at a predetermined point in the cycle, the spacing between said disengagement points and the spacing between said possible engagement positions having a multiple relationship.

4. In a multispeed indexing device, driving means, driven means, speed change gearing interconnecting said means, said speed change gearing comprising a plurality of positive clutching means adapted to establish driving connections having different speed ratios between said driving means and said driven means, each of said clutching means comprising, engagement means and a rotatable control element, said engagement means being adapted to provide positive engagement between said control element and said driving means at a plurality of equally spaced indexed positions, the spacing of said indexed positions in each clutching means having a whole number multiple relationship to the spacing of said indexed positions in one of said clutching means, said control elements being adapted to effect the engagement and disengagement of said engagement means to control different speeds of said speed change gearing, each of said control elements having a plurality of stop means thereon spaced at equal angular distances, said equal angular distances and the spacing of said equally spaced index positions having a multiple relationship, and detent means associated with each of said control elements, said detent means adapted to engage selected stop members of their respective control elements to declutch said driving means from said driven means, said control elements being geared to said driven means so as to determine an exact position of said driven means when stopped by said detent means.

5. In a multispeed indexing device, driving means, driven means, speed change gearing interconnecting said means, said speed change gearing comprising a plurality of positive clutching means adapted to establish driving connections having different speed ratios between said driving means and said driven means, each of said clutching means comprising, engagement means and a rotatable control element, said engagement means being adapted to provide positive engagement between said control element and said driving means at one of a plurality of equally spaced indexed positions, the spacing of said indexed positions in the different clutching means having a whole number multiple relationship, said control elements being adapted to effect the engagement and disengagement of said engagement means to control different speeds of said speed change gearing, each of said control elements having a plurality of stop means thereon spaced at equal angular distances, said equal angular distances and the spacing of said equally spaced index positions having a multiple relationship, detent means associated with each of said control elements, said detent means adapted to engage selected stop members of their respective control elements to declutch said driving means from said driven means, said control elements being geared to said driven means so as to determine an exact position of said driven means when stopped by said detent means; and detent control means, said detent control means being adapted to effect engagement and disengagement of said detent means to engage and disengage selected clutching means at selectable points in the cycle.

6. In a multispeed indexing device; information storage means, information input means, said means being adapted to receive and store information relative to a desired indexing position, driving means, driven means, speed change gearing interconnecting said means, said speed change gearing comprising a plurality of positive clutching means adapted to establish driving connections having different speed ratios between said driving means and said driven means, each of said clutching means comprising, engagement means and a rotatable control element, said engagement means being adapted to provide positive engagement between said control element and said driving means at a plurality of equally spaced indexed positions, the spacing of said indexed positions in the different clutching means having a whole number multiple relationship, said control elements being adapted to effect the engagement and disengagement of said engagement means to control different speeds of said speed change gearing, each of said control elements having a plurality of stop means thereon spaced at equal angular distances, said equal angular distances and the spacing of said equally spaced index positions having a multiple relationship, detent means associated with each of said control elements, said detent means adapted to engage selected stop members of their respective control elements to declutch said driving means from said driven means, said control elements being geared to said driven means so as to determine an exact position of said driven means when stopped by said detent means, and detent control means responsive to said information storage means.

7. In a machine for indexing objects in accordance with machine readable information contained on documents; means for moving said objects, comprising driving means, driven means, speed change gearing interconnecting said means, said speed change gearing comprising a plurality of positive clutching means adapted to establish driving connections having different speed ratios between said driving means and said driven means, each of said clutching means comprising, engagement means and a rotatable control element, said engagement means being adapted to provide positive engagement between said control element and said driving means at a plurality of equally spaced indexed positions, the spacing of said indexed positions in the different clutching means having a whole number multiple relationship, said control elements being adapted to effect the engagement and disengagement of said engagement means to control different speeds of said speed change gearing, each of said control elements having a plurality of stop means thereon spaced at equal angular distances, said equal angular distances and the spacing of said equally spaced index positions having a multiple relationship, detent means associated with each of said control elements, said detent means adapted to engage selected stop members of their respective control elements to declutch said driving means from said driven means, said control elements being geared to said driven means so as to determine an exact position of said driven means when stopped by said detent means; detent control means, document reading means, and means controlled by said last-mentioned means for operating said detent control means to effect engagement and disengagement of said detent means to engage and disengage selected clutching means at selectable points in the cycle.

8. In a machine for indexing objects in accordance with machine readable information contained on documents; document reading means; information storage means adapted to store information read by said document reading means, means for moving said objects, said means for moving objects comprising driving means, driven means, speed change gearing interconnecting said means, said speed change gearing comprising a plurality of positive clutching means adapted to establish driving connections having different speed ratios between said driving means and said driven means, each of said clutching means comprising, engagement means and a rotatable control element, said engagement means being adapted to provide positive engagement between said control element and said driving means at a plurality of equally spaced indexed positions, the spacing of said indexed positions in the different clutching means having a whole number multiple relationship, said control elements being adapted to effect the engagement and disengagement of said engagement means to control different speeds of said speed change gearing, each of said control elements having a plurality of stop means thereon spaced at equal angular distances, said equal angular distances and the spacing of said equally spaced index positions having a multiple relationship, detent means associated with each of said control elements, said detent means adapted to engage selected stop members of their respective control elements to declutch said driving means from said driven means, said control elements being geared to said driven means so as to determine an exact position of said driven means when stopped by said detent means, detent control means, said detent control means being adapted to effect engagement and disengagement of said detent means to engage and disengage selected clutching means at selectable points in the cycle under the control of said information storage means.

9. In a machine for printing information on the line of a document designated by machine readable information contained thereon; printing means; feeding means for successively feeding the documents to said printing means; said feeding means comprising driving means, driven means, and speed change gearing including a plurality of positive type clutches and gearing interconnecting the output of said clutches; document reading means; means controlled by said reading means for storing the information designating the desired print position; a plurality of control means continuously synchronized with said driving means, each adapted to engage selected clutching means only at selected characteristic index points in the cycle of said driving means and to disengage selected clutching means at any characteristic index point in the cycle of the driven means, and means to render selected control means effective to engage and disengage said clutching means in response to said storage means.

10. In a device for printing information on the line of a document designated by machine readable information contained thereon; printing means; feeding means for successively feeding the documents to said printing means, said feeding means comprising, driving means, driven means, speed change gearing interconnecting said means, said speed change gearing comprising a plurality of positive clutching means adapted to establish driving connections having different speed ratios between said driving means and said driven means, each of said clutching means comprising engagement means and a rotatable control element, said engagement means being adapted to provide positive engagement between said control element and said driving means at a plurality of equally spaced indexed positions, the spacing of said indexed positions in the different clutching means having a whole number multiple relationship, said control elements being adapted to effect the engagement and disengagement of said engagement means to control different speeds of said speed change gearing, each of said control elements having a plurality of stop means thereon spaced at equal angular distances, said equal angular distances and the spacing of said equally spaced index positions having a multiple relationship, detent means associated with each of said control elements, said detent means adapted to engage selected stop members of their respective control elements to declutch said driving means from said driven means, said control elements being geared to said driven means so as to determine an exact position of said driven means when stopped by said detent means; document reading means, storage means for storing the information designating the desired print position, and detent control means controlled by said storage means for controlling the engagement of said detent means.

11. In a cyclic device for positioning a card at a print station at the specific line on the card designated by line selection indicia thereon; driving means; driven means; speed change gearing interconnecting said means, said speed change gearing comprising a plurality of positive type clutching means adapted to establish driving connections having different speed ratios between said driving means and said driven means; a plurality of control means continuously synchronized with said driving means, each adapted to engage and disengage selected clutching means at predetermined points in said cycle; reading means for reading said indicia from said card; and means responsive to said reading means to render selected control means effective.

12. In a cyclic multispeed indexing device, driving means; driven means; speed change gearing interconnecting said means, said speed change gearing comprising a plurality of positive clutching means adapted to establish driving connections having different speed ratios between said driving means and said driven means; and control means for selectively engaging selected clutching means only at selected characteristic index points in the cycle of said driving means and for disengaging said clutching means at any characteristic index point in the cycle of the driven means, said control means comprising timing means continuously synchronized with said driving means and settable means to render said timing means effective to engage selected clutching means during selected portions of the cycle.

13. In a cyclic device for positioning a document at a print station at the specific line on the document designated by line selection indicia thereon; driving means; driven means; speed change gearing interconnecting said means, said speed change gearing comprising a plurality of positive type clutching means adapted to establish driving connections having different speed ratios between said driving means and said driven means, said clutching means adapted to engage selected clutching means only at selected characteristic index points in the cycle of said driving means and to disengage selected clutching means at any characteristic index point in the cycle of the driven means; and control means for controlling the engagement of said clutching means, said control means including timing means continuously synchronized with said driving means and settable means to render said timing means effective to engage selected clutching means during selected portions of the cycle of said driving means; document reading means, and means for setting said settable means in accordance with the information read from said document.

14. In a cyclic multispeed indexing device, driving means; driven means; speed change gearing interconnecting said means, said speed change gearing comprising a plurality of positive clutching means adapted to establish driving connections having different speed ratios between said driving means and said driven means; engagement means associated with each clutching means for engaging the associated clutch only at selected characteristic index points in the cycle of the driving means; disengagement means associated with each clutch for disengaging the associated clutch at any characteristic index point in the cycle of the driven means; and control means continuously synchronized with the driving means for controlling said engagement means and said disengagement means.

References Cited in the file of this patent

UNITED STATES PATENTS

| | | |
|---|---|---|
| 2,131,895 | Kolm et al. | Oct. 4, 1938 |
| 2,156,990 | Keen | May 2, 1939 |
| 2,531,885 | Mills et al. | Nov. 28, 1950 |